(12) United States Patent
Kim (10) Patent No.: US 11,440,393 B2
(45) Date of Patent: Sep. 13, 2022

(54) FLUID-ENCLOSED ENGINE MOUNT

(71) Applicants: Hyundai Motor Company, Seoul (KR); Kia Motors Corporation, Seoul (KR)

(72) Inventor: Hyo Seok Kim, Whasung-Si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 172 days.

(21) Appl. No.: 16/702,899

(22) Filed: Dec. 4, 2019

(65) Prior Publication Data

US 2020/0391583 A1    Dec. 17, 2020

(30) Foreign Application Priority Data

Jun. 12, 2019   (KR) ..................... 10-2019-0069064

(51) Int. Cl.
*B60K 5/12* (2006.01)
*F16F 13/10* (2006.01)
*B62D 21/11* (2006.01)

(52) U.S. Cl.
CPC ............ *B60K 5/1208* (2013.01); *B62D 21/11* (2013.01); *F16F 13/10* (2013.01); *F16F 13/105* (2013.01)

(58) Field of Classification Search
CPC ....... B60K 5/1208; B62D 21/11; F16F 13/10; F16F 13/105
USPC ........................................ 267/140.11, 140.13
See application file for complete search history.

(56) References Cited

U.S. PATENT DOCUMENTS

| | | | | |
|---|---|---|---|---|
| 4,676,489 A | * | 6/1987 | Hofmann | F16F 13/107 267/122 |
| 4,773,634 A | * | 9/1988 | Hamaekers | F16F 13/106 137/493 |
| 4,787,610 A | * | 11/1988 | Kojima | F16F 13/20 188/317 |
| 4,946,147 A | * | 8/1990 | Kato | F16F 13/10 267/140.13 |
| 6,056,279 A | * | 5/2000 | Lee | F16F 13/10 180/300 |

(Continued)

FOREIGN PATENT DOCUMENTS

KR    10-1511533 B1    4/2015

*Primary Examiner* — Robert A. Siconolfi
*Assistant Examiner* — James K Hsiao
(74) *Attorney, Agent, or Firm* — Morgan, Lewis & Bockius LLP (57) ABSTRACT

A fluid-enclosed engine mount may include an insulator mounted between a core configured to be connected to an engine and an external pipe configured to be connected to a vehicle body, the insulator being provided with an internal space enclosing fluid; an orifice module disposed at the inside of a lower side portion of the insulator to divide the internal space into an upper chamber and a lower chamber, the orifice module being provided with a fluid passage for allowing fluid to fluidically-communicate between the upper chamber and the lower chamber; a support member disposed between an external surface of the orifice module and the lower side portion of the insulator to elastically support the orifice module to be vertically movable; and a pipe member disposed between the lower side portion of the insulator and the support member to support an external surface of the support member.

10 Claims, 6 Drawing Sheets

(56) References Cited

U.S. PATENT DOCUMENTS

| | | | | |
|---|---|---|---|---|
| 6,378,850 B1* | 4/2002 | Shimizu | F16F 13/10 | 267/140.13 |
| 6,663,090 B2* | 12/2003 | Simuttis | F16F 13/262 | 267/140.13 |
| 7,419,144 B2* | 9/2008 | Hasegawa | F16F 13/106 | 267/140.13 |
| 8,056,888 B2* | 11/2011 | Siemer | F16F 13/10 | 267/140.5 |
| 8,485,506 B2* | 7/2013 | Matsuda | B60K 5/1208 | 267/140.13 |
| 8,919,748 B2* | 12/2014 | Urayama | H02K 41/0356 | 267/140.14 |
| 9,488,246 B2* | 11/2016 | Satori | F16F 13/10 | |
| 9,958,024 B2* | 5/2018 | Kadowaki | F16F 13/10 | |
| 10,781,881 B2* | 9/2020 | Ishikawa | F16F 13/106 | |
| 2002/0130455 A1* | 9/2002 | Yamamoto | F16F 13/105 | 267/140.13 |
| 2004/0113040 A1* | 6/2004 | Compain | F16F 1/387 | 248/564 |
| 2006/0043658 A1* | 3/2006 | Tanaka | F16F 13/108 | 267/140.13 |
| 2007/0057421 A1* | 3/2007 | Nanno | F16F 13/105 | 267/140.13 |
| 2008/0284075 A1* | 11/2008 | Saito | F16F 13/105 | 267/140.13 |
| 2009/0026671 A1* | 1/2009 | Kojima | F16F 13/1463 | 267/121 |
| 2010/0072683 A1* | 3/2010 | Saito | F16F 13/106 | 267/140.13 |
| 2011/0031663 A1* | 2/2011 | Matsuda | B60K 5/1208 | 267/140.13 |
| 2011/0101581 A1* | 5/2011 | Kubo | F16F 13/106 | 267/140.13 |
| 2012/0091640 A1* | 4/2012 | Ogawa | F16F 13/101 | 267/140.11 |
| 2012/0306135 A1* | 12/2012 | Tsutsumi | F16F 13/105 | 267/140.13 |
| 2013/0001842 A1* | 1/2013 | Kanaya | F16F 13/106 | 267/140.13 |
| 2013/0043626 A1* | 2/2013 | Satori | F16F 13/105 | 267/140.13 |
| 2013/0069288 A1* | 3/2013 | Saito | F16F 13/1481 | 267/140.13 |
| 2013/0175745 A1* | 7/2013 | Kojima | F16F 13/18 | 267/140.13 |
| 2013/0187317 A1* | 7/2013 | Naiki | F16F 13/08 | 267/140.13 |
| 2013/0256960 A1* | 10/2013 | Marienfeld | F16F 13/264 | 267/140.14 |
| 2014/0327198 A1* | 11/2014 | Preikszas | F16F 13/107 | 267/140.13 |
| 2015/0041617 A1* | 2/2015 | Okumura | F16F 1/3863 | 248/562 |
| 2015/0252866 A1* | 9/2015 | Muraoka | F16F 13/085 | 267/140.13 |
| 2016/0053846 A1* | 2/2016 | Nagasawa | F16F 13/08 | 267/140.13 |
| 2017/0016508 A1* | 1/2017 | Ueki | F16F 13/107 | |
| 2017/0023089 A1* | 1/2017 | Ueki | F16F 13/105 | |
| 2017/0030428 A1* | 2/2017 | Ueki | F16F 13/107 | |
| 2017/0089421 A1* | 3/2017 | Ueki | F16F 13/107 | |
| 2017/0146089 A1* | 5/2017 | Genderjahn | B60K 5/1208 | |
| 2017/0313171 A1* | 11/2017 | Yoon | F16F 13/08 | |
| 2017/0335920 A1* | 11/2017 | Kanaya | F16F 13/103 | |
| 2017/0341500 A1* | 11/2017 | Oki | F16F 1/3605 | |
| 2018/0009306 A1* | 1/2018 | Nakamaru | F16F 1/36 | |
| 2018/0073591 A1* | 3/2018 | Nagasawa | F16F 13/107 | |
| 2018/0320753 A1* | 11/2018 | Beckmann | F16F 13/103 | |
| 2019/0017567 A1* | 1/2019 | Kim | F16F 13/105 | |
| 2019/0017568 A1* | 1/2019 | Kim | F16F 13/107 | |
| 2019/0061509 A1* | 2/2019 | Kim | B60K 5/1275 | |
| 2019/0128364 A1* | 5/2019 | Kim | B60K 5/1208 | |
| 2019/0248220 A1* | 8/2019 | Choi | B60K 5/1225 | |
| 2019/0329640 A1* | 10/2019 | Kadowaki | F16F 1/36 | |

* cited by examiner

FLUID-ENCLOSED ENGINE MOUNT

CROSS-REFERENCE TO RELATED APPLICATION

The present application claims priority to Korean Patent Application No. 10-2019-0069064 filed on Jun. 12, 2019, the entire contents of which is incorporated herein for all purposes by this reference.

BACKGROUND OF THE INVENTION

Field of the Invention

The present invention relates to a fluid-enclosed engine mount of a vehicle, and more particularly, to an engine mount which controls behavior of engine mounted to a vehicle body and insulate a vibration.

Description of Related Art

Generally, a vehicle has employed an engine mount to control engine behavior and insulate a vibration. In a conventional engine mount, a fluid-enclosed engine mount has been mainly employed to absorb vibrations of the engine which are appeared over a wide frequency band.

Figure 7:
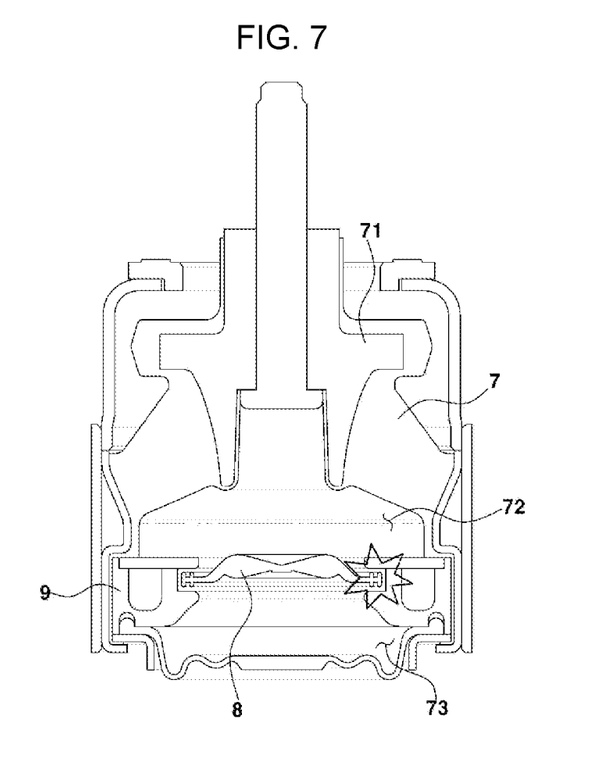
FIG. 7 is a view showing a conventional engine mount.

FIG. 7 is a view showing a conventional fluid-enclosed engine mount.

As illustrated in FIG. 7, a conventional fluid-enclosed engine mount employs an insulator 7 and fluid to absorb a vibration of an engine. The insulator 7 is attached to a core 71 which is fastened to the engine to allow a vibration of the engine to be transmitted thereto. Fluid absorbs a vibration of the engine while passing through a flow path between an upper chamber 72 and a lower chamber 73 disposed below the insulator 7. The upper chamber 72 and the lower chamber 73 are partitioned by a membrane 8 and an orifice module 9 disposed therebetween. The membrane 8 is mounted at a center portion of the orifice module 9, and fluid passes between the membrane 8 and the orifice module 9. An edge portion of the membrane 8 is mounted on and constrained by the orifice module 9, and is vibrated by a flow of the above fluid.

In the engine mount, insulation performance against a small-displacement vibration in the high-frequency band may be improved by a flow of fluid passing between the membrane 8 and the orifice module 9. For a flow of the above fluid, the membrane 8 constrained to the orifice module 9 may be able to move smoothly. However, a flow of fluid passing between the membrane 8 and the orifice module 9 results in a vibration of the membrane 8, and as a movement of the membrane 8 becomes more smoother, a noise caused by a vibration of the membrane 8 is largely generated. That is, when a pressure of internal fluid is fluctuated by an excitation of the engine mount, the membrane is vibrated, and the membrane is collided with the orifice module as the membrane is vibrated, and therefore a noise is generated. Furthermore, when the membrane 8 is forcibly constrained to the orifice module 9 to prevent the above-mentioned noise from being generated, there is a limit to increase an insulation rate of the engine mount in the high-frequency band.

The information included in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a fluid-enclosed engine mount configured for improving an operational sound (that is, a noise) generated therein when a vibration is transmitted from an engine.

Accordingly, in an exemplary embodiment of the present invention, there is provided a fluid-enclosed engine mount including an insulator interposed between a core configured to be connected to an engine and an external pipe configured to be connected to a vehicle body, the insulator being provided with an internal space enclosing fluid; an orifice module mounted at the inside of a lower side portion of the insulator to divide the internal space into an upper chamber and a lower chamber, the orifice module being provided with a fluid passage for allowing fluid to fluidically-communicate between the upper chamber and the lower chamber; a support member mounted between an external surface of the orifice module and the lower side portion of the insulator to elastically support the orifice module to be vertically movable; and a pipe member mounted between the lower side portion of the insulator and the support member to support an external surface of the support member.

According to the exemplary embodiment of the present invention, the engine mount has the following features.

The support member may include a pipe portion fixed to an internal surface of the pipe member; a joining portion attached and fixed to an external surface of the orifice module; and a bridge portion formed to have a predetermined thickness between an internal surface of the pipe portion and an external surface of the joining portion.

The orifice module may be provided with a central passage formed at a center portion of the orifice module with respect to a radial direction of the orifice module to pass therethrough in a vertical direction of the orifice module. The central passage may include at least one through hole formed by perforating the center portion of the orifice module.

The fluid passage may include a C-shaped external passage disposed at the outside of the central passage to be formed in a circumferential direction of the orifice module; and a C-shaped internal passage disposed between the external passage and the central passage, wherein the internal passage being bent at one end portion of the external passage to be formed in the circumferential direction of the orifice module. The external passage may be connected to the upper chamber through an upper hole provided on an upper surface of the orifice module, and the internal passage may be in fluidic communication with the lower chamber via a lower hole provided on a lower surface of the orifice module.

Other aspects and exemplary embodiments of the present invention are discussed infra.

It is understood that the term "vehicle" or "vehicular" or other similar term as used herein is inclusive of motor vehicles in general such as passenger vehicles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles. The above and other features of the present invention are discussed infra.

The methods and apparatuses of the present invention have other features and advantages which will be apparent from or are set forth in more detail in the accompanying drawings, which are incorporated herein, and the following Detailed Description, which together serve to explain certain principles of the present invention.

It may be understood that the appended drawings are not necessarily to scale, presenting a somewhat simplified representation of various exemplary features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent portions of the present invention throughout the several figures of the drawing.

DETAILED DESCRIPTION

Hereinafter reference will now be made in detail to various embodiments of the present invention, examples of which are illustrated in the accompanying drawings and described below. While the present invention will be described in conjunction with exemplary embodiments of the present invention, it will be understood that present description is not intended to limit the present invention to those exemplary embodiments. On the other h, and the present invention is directed to cover not only the exemplary embodiments of the present invention, but also various alternatives, modifications, equivalents and other embodiments, which may be included within the spirit and scope of the present invention as defined by the appended claims.

Hereinafter, the present invention will be described so that those skilled in the art can easily implement the present invention.

Figure 1:
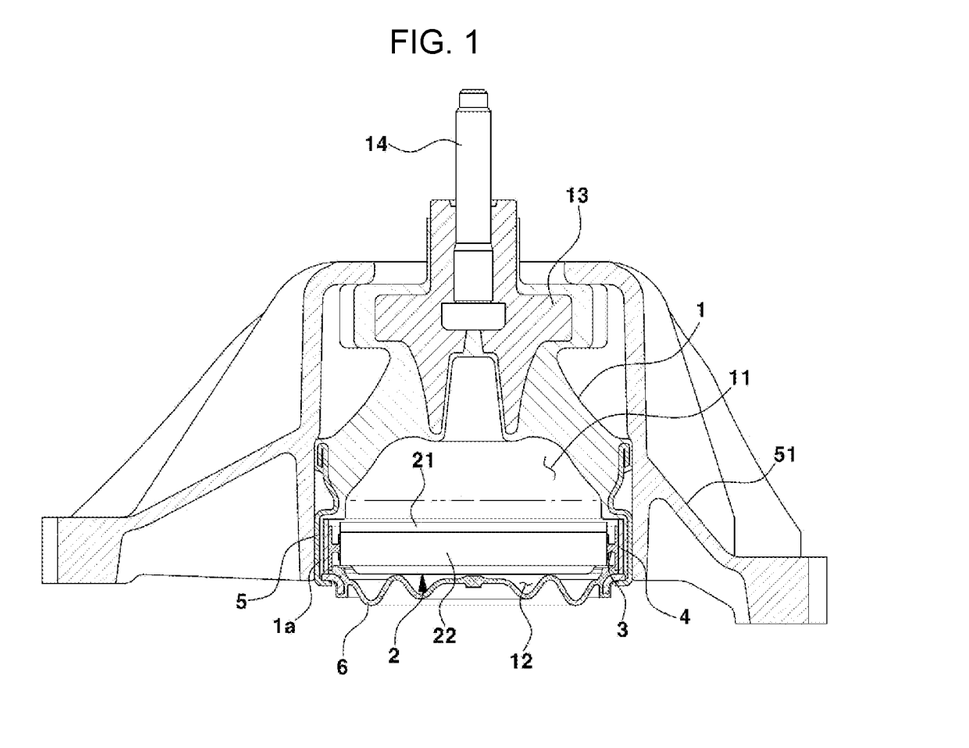
FIG. 1 is a cut-away perspective view showing an engine mount according to an exemplary embodiment of the present invention.
Figure 2:
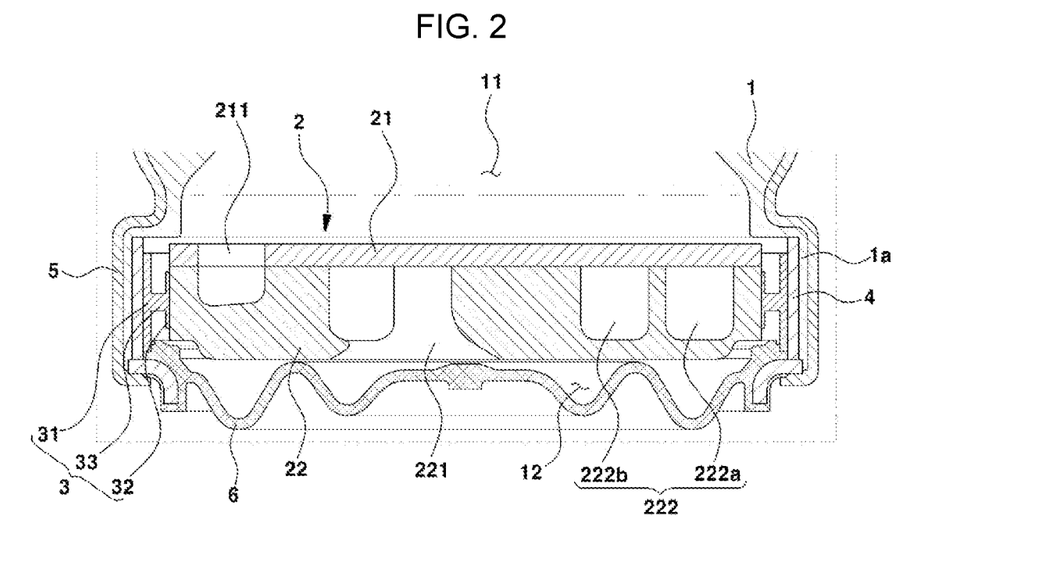
FIG. 2 is a cut-away enlarged perspective view showing a main portion of the engine mount according to an exemplary embodiment of the present invention.

In a fluid-enclosed engine mount of the present invention, as shown in FIG. 1 and FIG. 2, a conventional membrane causing a noise generation is omitted, and a dual insulation structure is mounted outside an orifice module 2. The double insulation structure supports the orifice module 2 to be vertically movable, and simultaneously attenuates a noise generated by the orifice module 2 to reduce a noise transmitted to a vehicle body side thereof.

The engine mount includes an insulator 1 connected between an engine and the vehicle body, the orifice module 2 assembled inside the insulator 1, and a support module disposed on an external surface of the orifice module 2. The support module may include a support member 3 and a pipe member 4.

The insulator 1 is an insulator formed of an elastic material such as rubber, and may be integrally formed with a core 13 and an external pipe 5 to be located between the core 13 and the external pipe 5. An upper portion of the insulator 1 may be integrally formed with and supported on an external surface of the core 13 connected to the engine, a lower side portion 1a of the insulator 1 may be integrally formed with and supported on an internal surface of the external pipe 5 coupled to the vehicle body. The present insulator 1 may be vulcanized and absorb a vibration transmitted from the engine thereto through the core 13 to insulate a vibration of the engine transmitted to the vehicle body.

The core 13 may be coupled to the engine through a bolt member 14 provided at an upper side thereof, and the external pipe 5 may be coupled to the vehicle body through a mount bracket 51 mounted on the outside thereof. The core 13 may be integrally moved with the engine, and the insulator 1 may be moved in a response to a vertical behavior of the engine, to be elastically deformed and to attenuate a vibration transmitted to the vehicle body. The external pipe 5 may be integrally attached to an external surface of the lower side portion 1a of the insulator 1 to support the insulator 1.

Furthermore, the insulator 1 is provided with an internal chamber in which a fluid for insulating a vibration is enclosed, and the internal space may be disposed below the core 13. The internal space may be bisected by the orifice module 2.

The orifice module 2 may be disposed inside the lower side portion 1a of the insulator 1 to partition the internal space into an upper chamber 11 and a lower chamber 12. The orifice module 2 includes an upper hole 211 and a lower hole 221 for allowing fluid to enter/exit, and further includes a fluid passage 222 disposed between the upper hole 211 and the lower hole 221. The fluid passage 222 enables fluid to flow between the upper chamber 11 and the lower chamber 12.

The lower chamber 12 may be sealed by the orifice module 2, the support member 3, a diaphragm 6, and the like. The diaphragm 6 may be mounted to the external pipe 5 at a lower side of the orifice module 2 to form the lower chamber 12 and to simultaneously close the lower chamber 12.

The support member 3 is disposed on the external surface of the orifice module 2 to elastically support the orifice module 2 to be vertically movable. To the present end portion, the support member 3 may be integrally formed between the external surface of the orifice module 2 and an internal surface of the pipe member 4. The support member 3 insulates vibration and noise transmitted from the orifice module 2, while supporting the orifice module 2. The support member 3 supports the external surface of the orifice module 2 so that a vertical movement of the orifice module 2 is smoothly performed, reducing a pressure fluctuation of fluid to reduce a noise generated by the above pressure fluctuation.

Since a noise generated by the orifice module 2 (i.e., an operational sound) is proportional to the pressure of fluid, by reducing the pressure fluctuation of fluid, it is possible to reduce operating sound magnitude of the orifice module 2. Herein, a direction of vertical movement of the orifice module 2 is the same as that of a vertical behavior of the vehicle and engine. The support member 3 may be vulcanized using an elastic material such as rubber and the like.

The orifice module 2 is mounted inside the insulator 1 by the support member 3 to be vertically movable, so that the orifice module is configured for performing a function of a conventional membrane.

Furthermore, the pipe member 4 is disposed between the lower side portion 1a of the insulator 1 and the support member 3 to support an external surface of the support member 3. The pipe member 4 may be inserted into and mounted to the lower side portion 1a of the insulator 1 in a state in which it is bonded to the external surface of the support member 3. At the instant time, an external surface of the pipe member 4 may become into close contact with an internal surface of the lower side portion 1a of the insulator 1. That is, the pipe member 4 may be supported by the lower side portion 1a of the insulator 1, and the insulator 1 may insulate vibration and noise transmitted from the pipe member 4.

When the orifice module 2 is directly mounted on the lower side portion 1a of the insulator 1 without the support member 3 and the pipe member 4, it is impossible to smoothly generate a vertical movement of the orifice module 2 according to a pressure fluctuation of fluid, and it becomes difficult to secure insulation performance due to the vertical movement of the orifice module 2.

Since the engine mount is provided with the support module including the support member 3 and the pipe member 4 mounted on the external surface of the orifice module 2, when the pressure of fluid enclosed in the internal space of the insulator 1 is fluctuated by engine behavior, it is possible to insulate a small-displacement vibration by the vertical movement of the orifice module 2.

Furthermore, by disposing the pipe member 4 between the external surface of the support member 3 and the internal surface of the lower side portion 1a of the insulator, the dual insulation structure including the support member 3 and the lower side portion 1a of the insulator 1 is implemented between the orifice module 2 and the external pipe 5.

Figure 5:
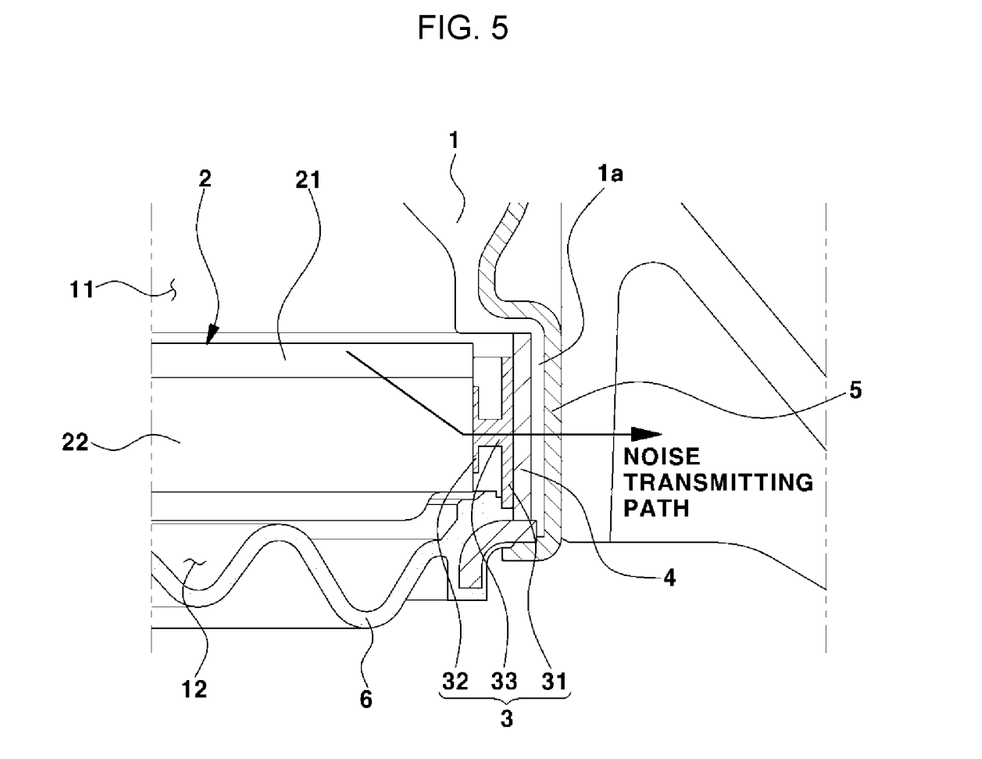
FIG. 5 is a view showing a noise transmitting path in the engine mount according to an exemplary embodiment of the present invention.

The engine mount may generate a noise through the orifice module according to a flow of fluid enclosed in the internal space of the insulator 1. Furthermore, a noise generated by the orifice module 2 is transmitted from the orifice module 2 to the support member 3, the pipe member 4, the lower side portion 1a of the insulator 1, the external pipe 5 and the mount bracket 51 (See FIG. 5). At the instant time, it is possible to effectively insulate a noise by the present dual insulation structure.

In the engine mount, in other words, due to a configuration in which the orifice module 2 is supported by the dual insulation structure including the support member 3 and the lower side portion 1a of the insulator 1, it is possible to absorb a small-displacement vibration by a vertical movement of the orifice module 2 and simultaneously to significantly reduce a noise generated through the orifice module 2.

Meanwhile, as may be seen in FIG. 2, the support member 3 may include a pipe portion 31, a joining portion 32, and a bridge portion 33 disposed therebetween.

The pipe portion 31 is disposed to be adjacent to the internal surface of the pipe member 4, and may be integrally fixed to the internal surface of the pipe member 4 at the time of molding. The pipe portion 31 is formed in a circumferential direction of the pipe member 4, and is spaced from the external surface of the orifice module 2 with a predetermined distance with respect to a radial direction of the orifice module 2.

The joining portion 32 is disposed to be adjacent to the external surface of the orifice module 2, and may be integrally attached and fixed to the external surface of the orifice module 2 at the time of molding.

The bridge portion 33 may be integrally formed and disposed between an internal surface of the pipe portion 31 and an external surface of the joining portion 32. The bridge portion 33 may be formed in an annular shape disposed in a circumferential direction of the orifice module 2, and may be formed to have a predetermined thickness to support a vertical movement of the orifice module 2. A thickness of the bridge portion 33 is based on a vertical direction thereof. The bridge portion 33 may have a thickness smaller than a vertical height of the orifice module 2, the joining portion 32, and the pipe portion 31.

Although the support member 3 is configured to include the pipe portion 31 and the joining portion 32 to more stably support a vertical movement of the orifice module 2, it is also possible to form the support member only using the bridge portion 33. Furthermore, the support member 3 may include the bridge portion 33 and the pipe portion 31, or may also include the bridge portion 33 and the joining portion 32. In other words, the bridge portion 33 may be directly fixed to the external surface of the orifice module 2 without the joining portion 32, or may be directly fixed to the internal surface of the pipe member 4 without the pipe portion 31.

Figure 3:
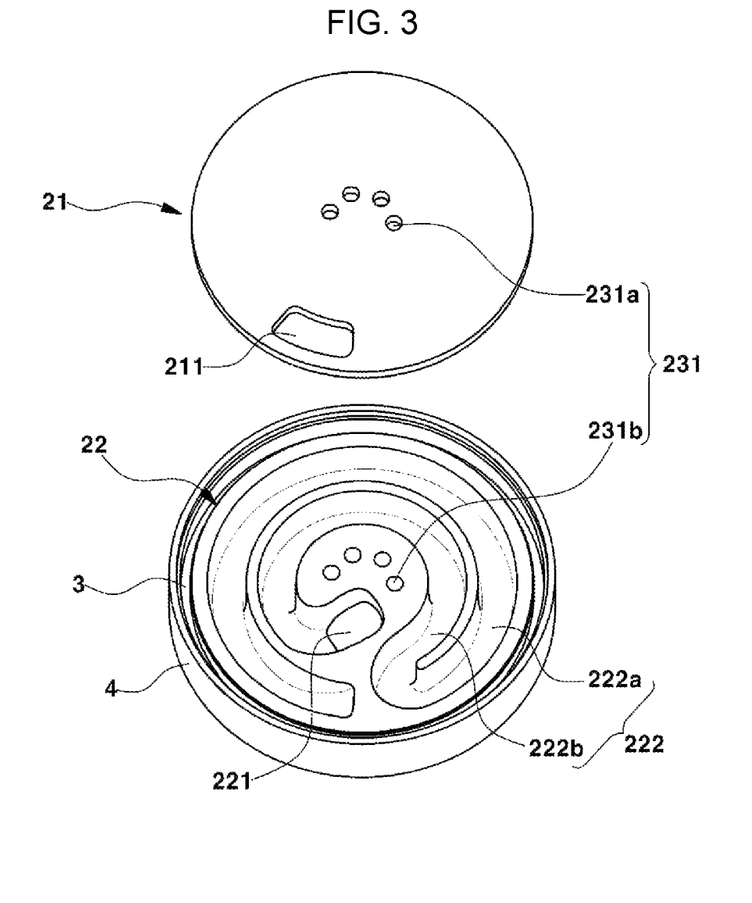
FIG. 3 is a perspective view showing an upper plate and a lower plate of an orifice module according to an exemplary embodiment of the present invention.
Figure 4:
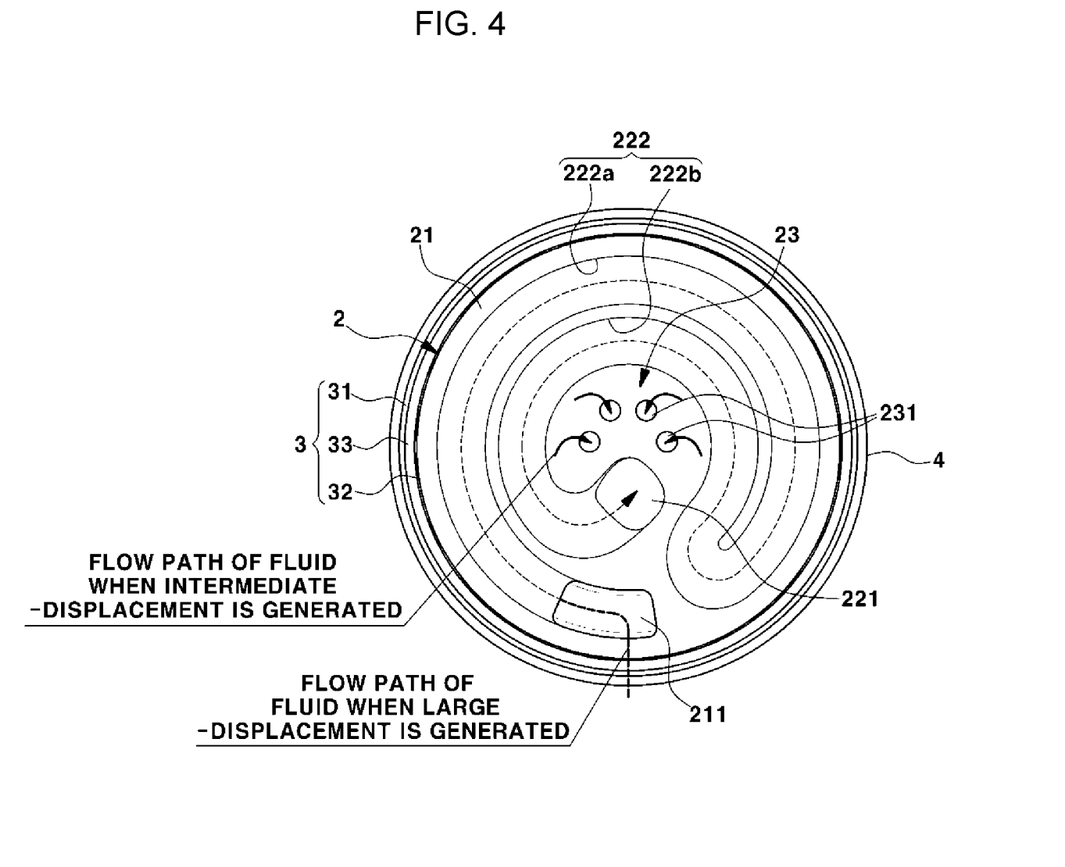
FIG. 4 is a top view of the orifice module according to an exemplary embodiment of the present invention.

As shown in FIG. 3 and FIG. 4, the engine mount may be provided with a central passage 23 in the orifice module 2 to insulate vibrations with various frequency ranges. The central passage 23 may be disposed at a center portion of the orifice module 2 with respect to the radial direction of the orifice module 2. The central passage 23 may be formed to pass through the center portion of the orifice module 2 in a vertical direction thereof. The central passage 23 may include at least one through hole 231 disposed at the center portion of the orifice module 2. The through hole 231 may be formed by perforating the center portion of the orifice module 2. Fluid enclosed in the internal space of the insulator 1 may flow between the upper chamber 11 and the lower chamber 12 through the through holes 231.

Furthermore, the fluid passage 222 of the orifice module 2 may include an external passage 222a and an internal passage 222b. The external passage 222a may be disposed on the outside of the central passage 23 and formed to extend in the circumferential direction of the orifice module 2. Furthermore, the internal passage 222b may be extended from one end portion (i.e., a first end portion) of the external passage 222a to be formed in the circumferential direction of the orifice module 2. The internal passage 222b may be disposed between the external passage 222a and the central passage 23, and may be disposed concentrically with the external passage 222a.

The external passage 222a may be formed as a C-shaped flow passage, and the one end portion (that is, the first end portion) of both end portions thereof is connected to the internal passage 222b and the other end portion (that is, a second end portion) is in fluidic communication with the upper hole 211. The internal passage 222b may also be formed as a C-shaped flow passage, and one end portion (that is, a first end portion) of both end portions thereof is connected to the first end portion of the external passage 222a and the other end portion (that is, a second end portion) is in fluidic communication with the lower hole 221. The internal passage 222b may be disposed on the inside of the external passage 222a to be adjacent thereto, and the first end portion of the internal passage 222b may be bent at the first end portion of the external passage 222a. In the fluid passage 222, accordingly, the first end portion of the external passage 222a and the first end portion of the internal passage 222b may be connected to each other in a curved shape.

The upper hole 211 and the lower hole 221 are provided on an upper surface and a lower surface of the orifice module 2, respectively, to act as an inlet and an outlet of the fluid passage 222. The external passage 222a is connected to the upper chamber 11 through the upper hole 211, and the internal passage 222b is in fluidic communication with the lower chamber 12 via the lower hole 221.

Figure 6:
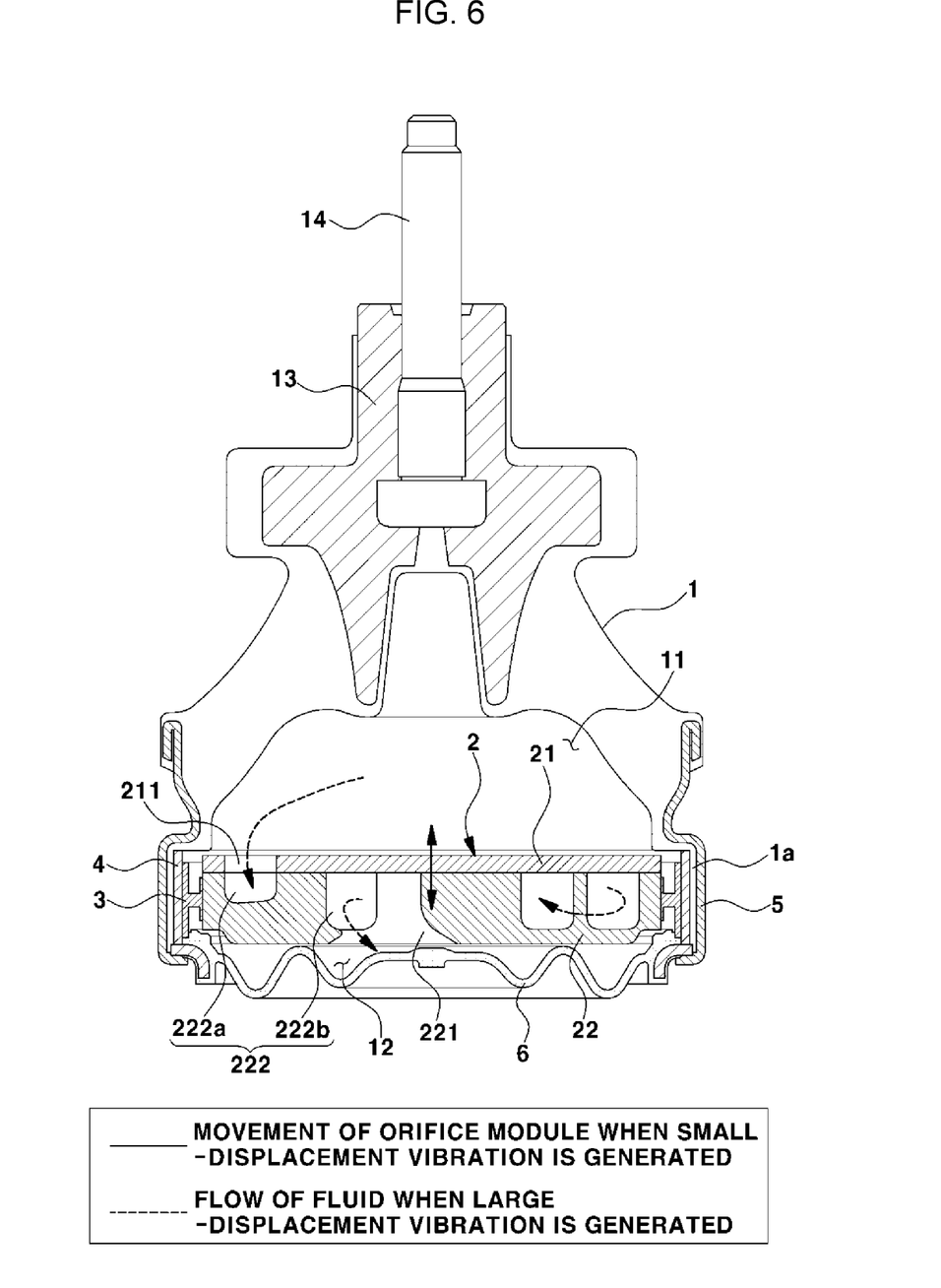
FIG. 6 is a view showing a vertical movement of the orifice module generated when a vibration of an engine is transmitted, and a flow passage of enclosed fluid.

The orifice module 2 configured as described above can insulate vibrations with various magnitudes transmitted through the core 13 (see FIGS. 4 and 6). When a small-displacement engine vibration is generated, for example, at the time of idling of an engine, the orifice module 2 may be moved upward and downward to absorb the pressure fluctuation value of fluid, lowering dynamic characteristics (i.e., stiffness) value of the engine mount.

Furthermore, when a large-displacement engine vibration is generated, for example when a vehicle is being traveled on a rugged road (see FIGS. 4 and 6), a vertical movement of the orifice module 2 is restricted the dynamic characteristic value of the support member 3 and a peripheral structure, and therefore fluid has to flow through the fluid passage 222, so that it is possible to significantly attenuate a transmitted vibration by a flow of fluid.

Furthermore, when an intermediate-displacement vibration in the range between the small-displacement vibration and the large-displacement vibration is generated (see FIG. 4), an engine vibration may be insulated by a flow of fluid passing through the central passage 23.

Here, the orifice module 2 may include an upper plate 21 provided with the upper hole 211 and a lower plate 22 provided with the lower hole 221 and the fluid passage 222. The upper plate 21 may be fixed to an upper end portion of the lower plate 22 in a stacked state, and the fluid passage 222 may be closed by the upper plate 21 when the upper plate 21 is stacked on and mounted to the lower plate 22. Furthermore, at least one through hole 231a may be formed at a center portion of the upper plate 21 and one or more through holes 231b may be formed at a center portion of the lower plate 22. The through hole 231a of the upper plate 21 and the through hole 231b of the lower plate 22 are vertically disposed to become the through hole 231 of the central passage 23.

The fluid-enclosed engine mount according to an exemplary embodiment of the present invention can dually attenuate an operational sound (that is, a noise) of the orifice module generated in the interior of the engine mount when a vibration is transmitted from the engine, significantly reducing a noise. Furthermore, the engine mount can effectively insulate a vibration within various frequency bands by the orifice module.

For convenience in explanation and accurate definition in the appended claims, the terms "upper", "lower", "inner", "outer", "up", "down", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A fluid-enclosed engine mount comprising:
   an insulator mounted between a core configured to be connected to an engine and an external pipe configured to be connected to a vehicle body, the insulator being provided with an internal space enclosing fluid;
   an orifice module disposed at the inside of a lower side portion of the insulator to divide the internal space into an upper chamber and a lower chamber, the orifice module being provided with a fluid passage for allowing fluid to fluidically-communicate between the upper chamber and the lower chamber through the fluid passage;
   a support member disposed between an external surface of the orifice module and the lower side portion of the insulator to elastically support the orifice module to be movable in a predetermined direction; and
   a pipe member disposed between the lower side portion of the insulator and the support member to support an external surface of the support member,
   wherein the support member is integrally formed with the external surface of the orifice module and an internal surface of the pipe member,
   wherein the support member includes:
   a pipe portion fixed to the internal surface of the pipe member;
   a joining portion attached and fixed to the external surface of the orifice module; and
   a bridge portion formed to have a predetermined thickness between an internal surface of the pipe portion and an external surface of the joining portion and connecting the internal surface of the pipe portion and the external surface of the joining portion.

2. The fluid-enclosed engine mount of claim 1, wherein a cross-section of the support member is formed to be in an uppercase H-shape.

3. The fluid-enclosed engine mount of claim 1, wherein the orifice module is provided with a central passage formed at a center portion of the orifice module with respect to a radial direction of the orifice module to pass therethrough in a vertical direction of the orifice module.

4. The fluid-enclosed engine mount of claim 3, wherein the central passage includes at least one through hole formed by perforating the center portion of the orifice module and the upper chamber and the lower chamber are fluidically communicated through the at least one through hole.

5. The fluid-enclosed engine mount of claim 3, wherein the fluid passage includes:
   an external passage disposed at the outside of the central passage to be formed in a circumferential direction of the orifice module; and
   an internal passage disposed between the external passage and the central passage, the internal passage being bent at an end portion of the external passage to be formed in the circumferential direction of the orifice module.

6. The fluid-enclosed engine mount of claim 5, wherein the external passage is fluidically connected to the upper chamber through an upper hole provided on an upper surface of the orifice module, and the internal passage is in fluidic communication with the lower chamber via a lower hole provided on a lower surface of the orifice module.

7. The fluid-enclosed engine mount of claim 1, wherein the orifice module includes:

an upper plate including an upper hole and at least one first through hole;

a lower plate mounted on a bottom surface of the upper plate and includes a lower hole and a central passage formed at a center portion of the lower plate, wherein the central passage includes at least one second through hole formed by perforating the center portion of the lower plate, and wherein the upper chamber and the lower chamber are fluidically communicated through the at least one first through hole and the at least one second through hole.

8. The fluid-enclosed engine mount of claim 7, wherein the fluid passage includes:

an external passage; and an internal passage disposed between the external passage and the central passage, wherein the external passage is fluidically connected to the upper chamber through the upper hole and the internal passage is fluidically connected to the lower chamber through the lower hole.

9. The fluid-enclosed engine mount of claim 1, wherein the external pipe is integrally attached to and disposed on an external surface of the lower side portion of the insulator.

10. The fluid-enclosed engine mount of claim 1, wherein the lower chamber is closed by a diaphragm disposed at a lower side of the orifice module and mounted to the external pipe.

* * * * *